Dec. 27, 1955                    E. E. YOUNG                    2,728,535
                                FISHING REEL
Filed April 27, 1954                                        2 Sheets-Sheet 1
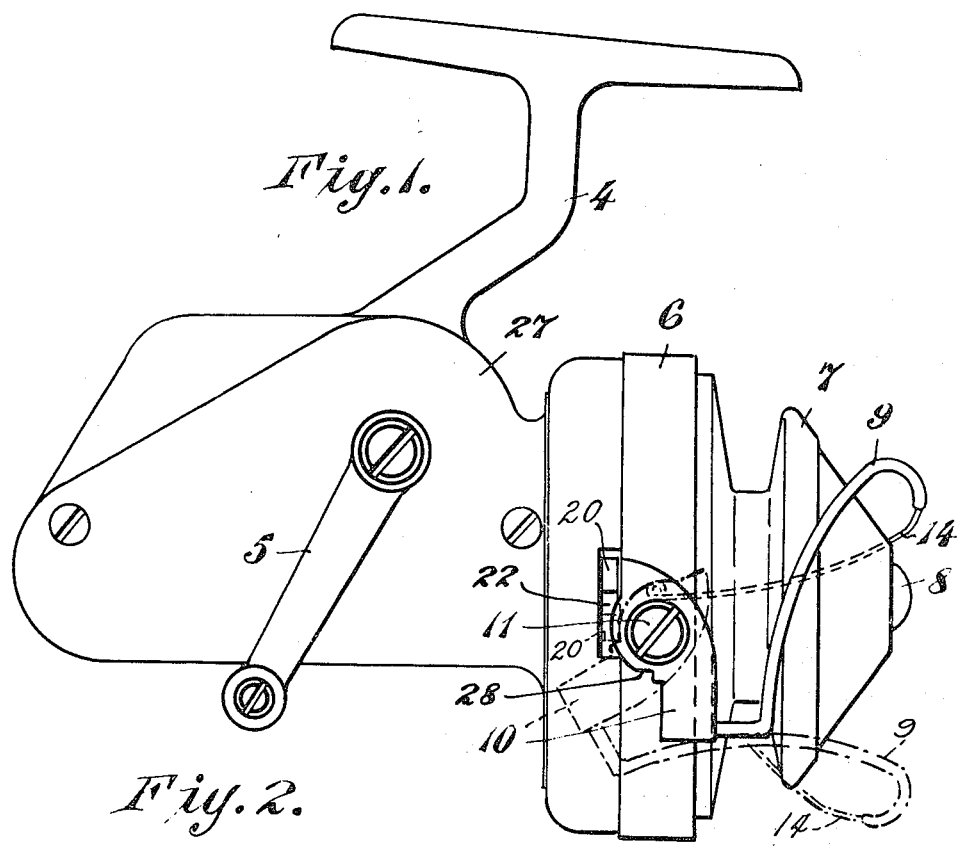
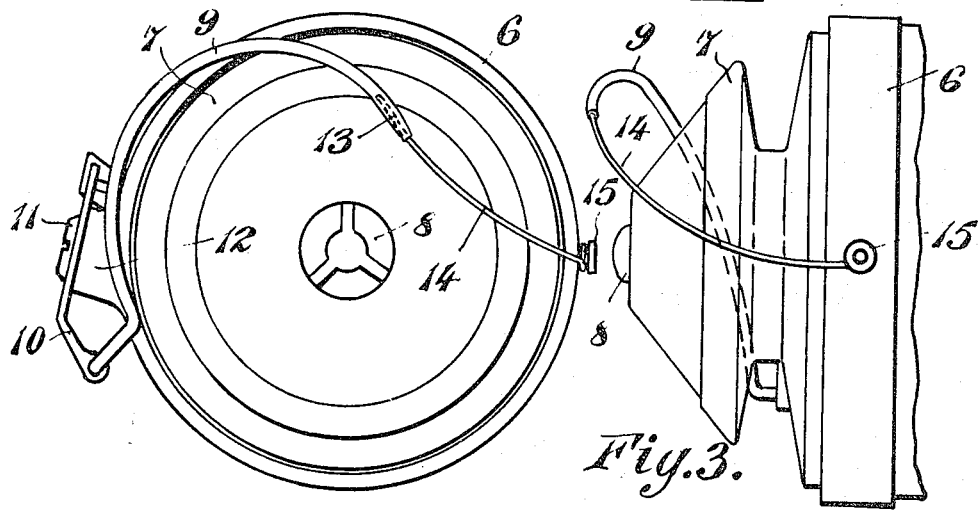
Inventor
Edward Emlyn Young
By
Marshall, Marshall & Yeasting
Attorneys Dec. 27, 1955  E. E. YOUNG  2,728,535
FISHING REEL
Filed April 27, 1954  2 Sheets-Sheet 2
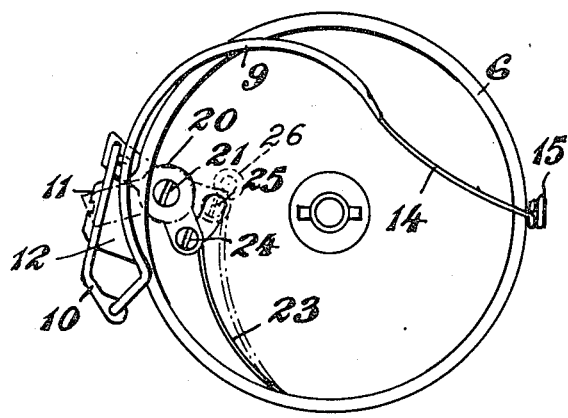
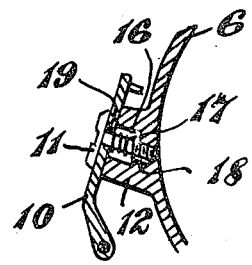
Inventor
Edward Emyln Young
By
Marshall, Marshall & Yeasting
Attorneys United States Patent Office 2,728,535
Patented Dec. 27, 1955

2,728,535
FISHING REEL

Edward Emlyn Young, Redditch, England, assignor to J. W. Young & Sons Limited, Redditch, England, a British company Application April 27, 1954, Serial No. 425,945

Claims priority, application Great Britain May 16, 1953

4 Claims. (Cl. 242—84.1)

This invention has relation to improvements in or connected with fishing reels of the kind known in the trade as casting reels of the stationary drum type, that is to say, of the type wherein a flyer adapted to engage the line during the reeling-in operation is rotated about the line drum by the rotation of a winding handle, the line drum itself not being rotatable by the winding handle.

A convenient embodiment of the present invention will now be described in its application to a fishing reel of the kind described in United States Patent No. 2,495,621, and for a clearer understanding of the present invention reference will be made to the accompanying drawings, in which:

Fig. 1 is a side elevation of a fishing reel in accordance with the present invention, showing the flyer in the reeling-in position in full lines, and in the casting position in broken lines.

Fig. 2 is an end view of the reel seen in Fig. 1, as seen from the right hand side thereof, and Fig. 3 is a side elevation of the line drum and flyer, as seen from the opposite side to that seen in Fig. 1.

Fig. 4 is an end view of the reel seen in Fig. 1 as seen from the right hand side of that figure and with the line drum removed from the reel, and Fig. 5 is a fragmentary sectional view through a portion of the rotatable drum casing showing the manner of mounting the flyer thereon.

In the drawings 4 represents the bracket arm whereby the reel is adapted to be secured to a fishing rod in the normal manner, and 5 represents the winding handle rotation whereof effects through a worm and worm wheel rotation of the rotatable drum casing 6, and at the same time through an eccentric and bellcrank lever an axial reciprocation of a non-rotatable spindle about which the line drum 7 is mounted in a non-axially slidable manner, a friction clutch being provided, the frictional resistance whereof can be adjusted by the screw cap 8 to determine the resistance to rotation of the line drum 7 about the spindle when the line drum is rotated in a direction to unwind the line therefrom, a ratchet being provided to prevent rotation of the line drum in the opposite direction.

The mechanism so far described is exactly similar to that described in the aforementioned patent.

According to the present invention the rotatable drum casing 6 is provided with an integral peripheral boss 12 having an outer face which is inclined at an angle to a tangent of the rotatable drum casing at that point from which it projects. The outer face of this boss is provided with a central recess 16 in the base of which is disposed a screw-threaded hole adapted to receive a headed screw 11 which serves as a pivot pin for a flyer comprising a rigid hook-like pickup 9 and a cam plate 10. This screw 11 is disposed on an axis inclined to a radius of the line drum 7 and the co-axial rotatable drum casing 6. Located within the recess 16 around the screw 11 is a coiled spring 17 the one end of which engages and is retained within a hole 18 in the base of the recess 16, whilst the other end engages within a hole 19 in the cam plate 10 mounted about the pivot pin constituted by the screw 11 and carrying the hook-like pickup 9 of the flyer, the purpose of this spring 17 being to urge the flyer towards its operative position, which will be more fully described hereinafter.

The free extremity of the pickup 9 of the flyer is formed with an axially extending bore 13 adapted to receive the one end of a flexible extension of the pickup 9, which is in the form of a length of spring wire 14. The opposite end of the spring wire 14 is looped around a stud 15, projecting from the periphery of the rotatable drum casing 6, at a point diametrically opposite the screw 11.

Co-operating with the cam face of the cam plate 10 is a trigger catch in the form of a bellcrank lever 20 which is pivoted at 21 on the front face of the back of the rotatable drum casing 6. The one arm of this lever 20 projects through a peripheral slot 22 in the rotatable drum casing and is urged towards the cam by a spring 23 carried by the other arm of the lever. This other arm of the lever 20 carries a rearwardly projecting pin 24 which extends through a slot 25 in the back of the rotatable drum casing 6 and is adapted to co-operate with a roller 26 on the forward face of the housing 27 in a manner which will be more fully described hereinafter. The hook-like pickup 9 of the flyer is secured to an extension of the cam plate 10 and when in the operative position extends forwardly parallel to the axis of the line drum and is then turned inwardly to form an arcuate hook which extends around and across the forward flange of the line drum as seen in full lines in Figs. 1 and 2.

When it is desired to effect a cast then the flyer can be moved to an inoperative position seen in broken lines in Fig. 1, in which position it is entirely free of the line which is to be pulled from the line drum 7. This inoperative position is achieved by turning the flyer comprising the hook-like pickup 9 and the cam plate 10 about its pivot 11 and, due to the fact that the axis of the pivot 11 is inclined to a radius of the line drum 7, the hook-like pickup of the flyer is moved rearwardly and away from the line drum in two planes. The flyer is maintained in this position against the action of the spring loading 17 by the one arm of the bellcrank lever 20 engaging on a flat 28 on the cam plate. When the winding handle 5 is rotated the flyer rotates with the drum casing 6 and as soon as the pin 24 on the inner end of the bellcrank lever 20 strikes the roller 26 on the forward face of the housing 27, the bellcrank lever 20 is tripped to disengage the outer arm thereof from the flat 28 on the cam face and permit the flyer to return to its operative position under the action of its spring loading 17 in which position the pickup 9 immediately picks up the line and continued rotation of the winding handle 5 effects a reeling of the line on to the line drum 7.

By virtue of the resilient nature of the wire 14 and its slidable connection to the free end of the pickup 9 the wire can accommodate itself to the path of motion imparted it during movement of the flyer from the reeling-in to the casting position, or vice versa, it being appreciated that this movement is in a path dependent upon the pivot pin 11 being inclined to a radius of the drum. The wire 14 is not fixed within the bore 13, but is slidable therein and is normally held in place by virtue of the resilient nature of the wire alone, so that if the part 14 should become damaged, it can be readily withdrawn from the pickup 9 and replaced by a similar length of spring wire. It may also be desirable for the part 14 to be disengaged from the pickup 9, so that the pickup 9 may be folded back into overlapping contact with the body of the reel for packing purposes.

I claim:

1. In a fishing reel having a nonrotatable drum and a rotatable drum casing, a flyer including a relatively rigid hook-like pickup, said pickup being pivotally mounted on said rotatable drum casing, the pivotal axis of said hook-like pickup being angularly disposed with respect to the successive radii of said drum passed by said hook-like pickup during rotation of said drum casing, said flyer also including a flexible extension having one end slidably connected to said hook-like pickup and another end connected to said rotatable drum casing.

2. In a fishing reel having a nonrotatable drum and a rotatable drum casing, a flyer including a relatively rigid hook-like pickup, said pickup being pivotally mounted on said rotatable drum casing, the pivotal axis of said hook-like pickup being angularly disposed with respect to the successive radii of said drum passed by said hook-like pickup during rotation of said drum casing, said hook-like pickup having a longitudinal bore extending into its extremity, said flyer also including a flexible extension having one end slidable in said bore and another end connected to said rotatable drum casing.

3. In a fishing reel having a nonrotatable drum and a rotatable drum casing, a flyer including a relatively rigid hook-like pickup, said pickup being pivotally mounted on said rotatable drum casing, the pivotal axis of said hook-like pickup being angularly disposed with respect to the successive radii of said drum passed by said hook-like pickup during rotation of said drum casing, said flyer also including a flexible extension having one end slidably connected to said hook-like pickup and another end connected to said rotatable drum casing, resilient means for urging said hook-like pickup to pivot into such position that said pickup extends over said drum and means for releasably locking said hook-like pickup against assuming such position.

4. In a fishing reel having a nonrotatable drum and a rotatable drum casing, a flyer including a relatively rigid hook-like pickup, said pickup being pivotally mounted on said rotatable drum casing, the pivotal axis of said hook-like pickup being angularly disposed with respect to the successive radii of said drum passed by said hook-like pickup during rotation of said drum casing, said hook-like pickup having a longitudinal bore extending into its extremity, said flyer also including a flexible extension having one end slidable in said bore and another end connected to said rotatable drum casing, resilient means for urging said hook-like pickup to pivot into such position that said pickup extends over said drum and means for releasably locking said pickup against assuming such position.

References Cited in the file of this patent

UNITED STATES PATENTS

| 2,498,987 | Duncan | Feb. 28, 1950 |
| 2,599,189 | Mauborgne | June 3, 1952 |

FOREIGN PATENTS

| 804,230 | France | July 27, 1936 |